United States Patent
Cote (10) Patent No.: US 11,930,912 B2
(45) Date of Patent: Mar. 19, 2024

(54) MOLDED SCREW

(71) Applicant: BROME BIRD CARE INC., Knowlton (CA)

(72) Inventor: Paul L. Cote, Knowlton (CA)

( * ) Notice: Subject to any disclaimer, the term of this patent is extended or adjusted under 35 U.S.C. 154(b) by 0 days.

(21) Appl. No.: 17/208,720

(22) Filed: Mar. 22, 2021

(65) Prior Publication Data

US 2021/0353037 A1  Nov. 18, 2021

Related U.S. Application Data

(60) Provisional application No. 63/025,460, filed on May 15, 2020.

(51) Int. Cl.
| | |
|---|---|
| *A45F 3/44* | (2006.01) |
| *E04H 12/22* | (2006.01) |
| *F16B 25/00* | (2006.01) |

(52) U.S. Cl.
CPC ........... *A45F 3/44* (2013.01); *E04H 12/2215* (2013.01); *E04H 12/2223* (2013.01); *E04H 12/2269* (2013.01); *F16B 25/0047* (2013.01); *F16B 25/0052* (2013.01); *F16B 25/0068* (2013.01)

(58) Field of Classification Search
CPC ... A45F 3/44; E04H 12/2269; E04H 12/2276; E04H 12/2223; E04H 12/2253; E04H 12/2215; F16B 25/0047; F16B 25/0068; F16B 25/0052; F16B 39/30; E02D 5/801
USPC ........................................................ 248/530
See application file for complete search history.

(56) References Cited

U.S. PATENT DOCUMENTS

| | | | | |
|---|---|---|---|---|
| 206,078 | A * | 7/1878 | Bowes ................ | E04H 12/2223 52/157 |
| 2,103,948 | A * | 12/1937 | Jones .................. | E04H 12/2223 248/156 |
| 2,603,319 | A * | 7/1952 | Dyche .................... | E02D 5/801 52/157 |
| 4,818,165 | A * | 4/1989 | Shirai ................. | F16B 25/0047 411/416 |
| 4,819,904 | A * | 4/1989 | Shpigel .................... | E04H 15/28 248/156 |
| 5,061,136 | A * | 10/1991 | Dixon ................. | F16B 25/0068 411/386 |
| 5,294,227 | A * | 3/1994 | Forster ................ | F16B 25/0084 411/386 |

(Continued)

FOREIGN PATENT DOCUMENTS

| | | | | |
|---|---|---|---|---|
| CA | 2520080 A1 * | 3/2006 | ................ | A45F 3/44 |
| DE | 20220515 U1 * | 10/2003 | ......... | E04H 12/2223 |

(Continued)

*Primary Examiner* — Taylor Morris
(74) *Attorney, Agent, or Firm* — Andrews Robichaud PC; Alessandro Colonnier (57) ABSTRACT

The present disclosure provides a molded screw preferably comprised of a sleeve portion to receive a pole, the sleeve portion connected to a conical shank terminating at a tip. The shank is in turn further comprised of at least one thread, the thread to facilitate drilling of the screw into the ground. The thread is further comprised of recessed portions that receive earth or dirt or other substances during the drilling process and stabilize the screw when it is set in the ground. In another embodiment, the shank is further comprised of a high and low thread, which spiral in alternating fashion to the tip of the screw.

16 Claims, 10 Drawing Sheets

(56) References Cited

U.S. PATENT DOCUMENTS

| | | | | |
|---|---|---|---|---|
| 5,340,254 A * | 8/1994 | Hertel | F16B 25/0021 | 411/311 |
| 5,358,209 A * | 10/1994 | Ward | E04H 12/2223 | 248/533 |
| 5,408,788 A * | 4/1995 | Hamilton | E02D 5/801 | 405/253 |
| 5,457,918 A * | 10/1995 | Plourde | E04H 12/2223 | 52/165 |
| 5,569,009 A * | 10/1996 | Suzuki | F16B 39/30 | 411/413 |
| 5,662,304 A * | 9/1997 | McDaniel | E04H 12/2223 | 52/165 |
| 5,833,399 A * | 11/1998 | Bullivant | E21B 17/046 | 405/292 |
| 5,885,041 A * | 3/1999 | Giannuzzi | F16B 25/0047 | 411/258 |
| 6,032,880 A * | 3/2000 | Verrills | E04H 12/2223 | 52/157 |
| 6,220,260 B1 * | 4/2001 | Sachs | E04H 12/2215 | 135/15.1 |
| 6,321,861 B1 * | 11/2001 | Leichter | E04H 12/2223 | 175/323 |
| 6,412,235 B1 * | 7/2002 | Pylant | E02D 5/801 | 175/323 |
| 6,702,239 B2 * | 3/2004 | Boucher | A01G 17/04 | 248/230.8 |
| 6,899,500 B2 * | 5/2005 | LeVey | B21H 3/02 | 411/416 |
| 7,007,910 B1 * | 3/2006 | Krinner | E04H 12/2223 | 52/165 |
| 7,101,133 B2 * | 9/2006 | Dicke | F16B 25/0057 | 411/386 |
| 7,484,920 B2 * | 2/2009 | Wieser | F16B 33/06 | 411/387.4 |
| 7,950,200 B2 * | 5/2011 | Tropiano | E04C 5/12 | 52/165 |
| 9,046,120 B2 * | 6/2015 | Phua | F16B 25/0052 | |
| 9,447,599 B1 * | 9/2016 | Parent | A47G 29/1216 | |
| 9,554,630 B1 * | 1/2017 | Patel | A45F 3/44 | |
| 10,077,893 B1 * | 9/2018 | Abraham | F16B 7/105 | |
| 10,687,628 B1 * | 6/2020 | Kite | E04H 12/2223 | |
| 2004/0163336 A1 * | 8/2004 | Hsu | E04H 12/2223 | 52/157 |
| 2006/0060749 A1 * | 3/2006 | Dahlstrom | A45F 3/44 | 248/156 |
| 2006/0097117 A1 * | 5/2006 | Yu | A45F 3/44 | 248/156 |
| 2006/0147295 A1 * | 7/2006 | Chen | F16B 25/0057 | 411/411 |
| 2006/0285940 A1 * | 12/2006 | Walther | F16B 25/0068 | 411/421 |
| 2007/0297871 A1 * | 12/2007 | Lu | F16B 25/0052 | 411/413 |
| 2008/0008555 A1 * | 1/2008 | Ardern | E04H 12/2223 | 411/411 |
| 2008/0099061 A1 * | 5/2008 | McKnight | A45B 11/00 | 248/156 |
| 2008/0217599 A1 * | 9/2008 | Scruggs | E04H 12/2223 | 256/65.02 |
| 2010/0247267 A1 * | 9/2010 | Bianchi | F16B 25/0084 | 411/387.4 |
| 2011/0036964 A1 * | 2/2011 | Escola Puig-corve | B23B 45/02 | 248/545 |
| 2011/0076112 A1 * | 3/2011 | Huang | F16B 25/00 | 411/412 |
| 2011/0188966 A1 * | 8/2011 | Tsai | F16B 25/0094 | 411/423 |
| 2012/0251268 A1 * | 10/2012 | Yu | F16B 25/0047 | 411/393 |
| 2013/0108374 A1 * | 5/2013 | Okobi | E04H 12/2269 | 405/259.1 |
| 2013/0302111 A1 * | 11/2013 | Shih | F16B 25/0026 | 411/387.4 |
| 2014/0007487 A1 * | 1/2014 | Schwiebert | E04H 12/2238 | 114/295 |
| 2014/0119852 A1 * | 5/2014 | Lee | F16B 25/0068 | 411/412 |
| 2015/0191886 A1 * | 7/2015 | Okobi | E04H 12/2269 | 52/157 |
| 2015/0368924 A1 * | 12/2015 | Izradel | F21S 8/085 | 362/183 |
| 2016/0223006 A1 * | 8/2016 | Hettich | F16B 37/127 | |
| 2016/0258467 A1 * | 9/2016 | Ogawa | F16B 25/0047 | |
| 2019/0338549 A1 * | 11/2019 | McDermott | E02D 5/801 | |
| 2020/0131795 A1 * | 4/2020 | Worm | A45B 23/00 | |
| 2021/0285262 A1 * | 9/2021 | Szrenko | E05B 67/383 | |
| 2022/0000249 A1 * | 1/2022 | Cohen | A45B 25/00 | |
| 2022/0349206 A1 * | 11/2022 | Burton | E04H 12/2223 | |
| 2023/0028488 A1 * | 1/2023 | Ellingson | E04H 12/2253 | |
| 2023/0200506 A1 * | 6/2023 | Yung | A45F 3/44 | 135/15.1 |

FOREIGN PATENT DOCUMENTS

| | | | | |
|---|---|---|---|---|
| DE | 202007004566 U1 * | 10/2007 | | E04H 12/2223 |
| DE | 202014104905 U1 * | 12/2014 | | E04H 12/2223 |
| EP | 1188938 A1 * | 3/2002 | | F16B 25/00 |
| EP | 2003270 A2 * | 12/2008 | | E02D 5/801 |
| GB | 2424906 A * | 10/2006 | | E04H 12/2223 |
| KR | 100903592 B1 * | 6/2009 | | E04H 12/2269 |
| KR | 20110032826 A * | 3/2011 | | E04H 12/2223 |
| WO | WO-8000425 A1 * | 3/1980 | | F16B 25/0026 |
| WO | WO-2006064174 A1 * | 6/2006 | | E02D 5/80 |
| WO | WO-2007033413 A1 * | 3/2007 | | E02D 5/80 |
| WO | WO-2013187844 A1 * | 12/2013 | | F16B 25/0026 |

* cited by examiner

MOLDED SCREW

CROSS REFERENCE TO RELATED APPLICATION

The present application claims priority to U.S. Provisional Application No. 63/025,460, entitled "Molded Screw" filed on May 15, 2020, the contents of which are incorporated herein by reference in their entirety.

FIELD

The disclosure relates to the field of drive screws, and more specifically to a molded drive screw with alternating crest and recessed portions.

BACKGROUND

Conical threaded screws have been in use for many years to facilitate drilling, among other uses. However, larger threaded drive screws with one or more helical threads can be cumbersome and difficult to manufacture with a mold. These types of screws are typically used with corresponding poles, to secure the pole into the ground and attach a sign, bird feeder, mailbox, or other attachments as known in the art. Unfortunately, winds can push the attachment and rotate the pole, resulting in the dislodging the drive screw. Finally, these screws are typically manufactured with one or more helical threads that are uniformly shaped. Unfortunately, a uniform shape of the thread reduces the amount of grip that the drill has in the ground and makes the drill prone to being dislodged.

As such, there is a need for an improved drive screw that can address and improve upon the shortcomings as outlined and described above.

SUMMARY

In an aspect, the present disclosures provides a molded screw comprising a sleeve portion adapted to receive a pole; and, a conically shaped shank extending from the sleeve to a lower end of the molded screw, the conically shaped shank further comprising: a high thread having recessed portions; and, a low thread, wherein the high thread and low threads extend from the sleeve portion to the lower end of the molded screw in an alternating spiral fashion.

In another aspect, the present disclosure provides a molded screw comprising a sleeve portion adapted to receive a pole; and, a conically shaped shank extending from the sleeve to a lower end of the molded screw, the conically shaped shank further comprising a thread having recessed portions, the thread extending from the sleeve portion to the lower end of the molded screw in a spiral fashion.

BRIEF DESCRIPTION OF THE DRAWINGS

The following figures serve to illustrate various embodiments of features of the disclosure. These figures are illustrative and are not intended to be limiting.

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
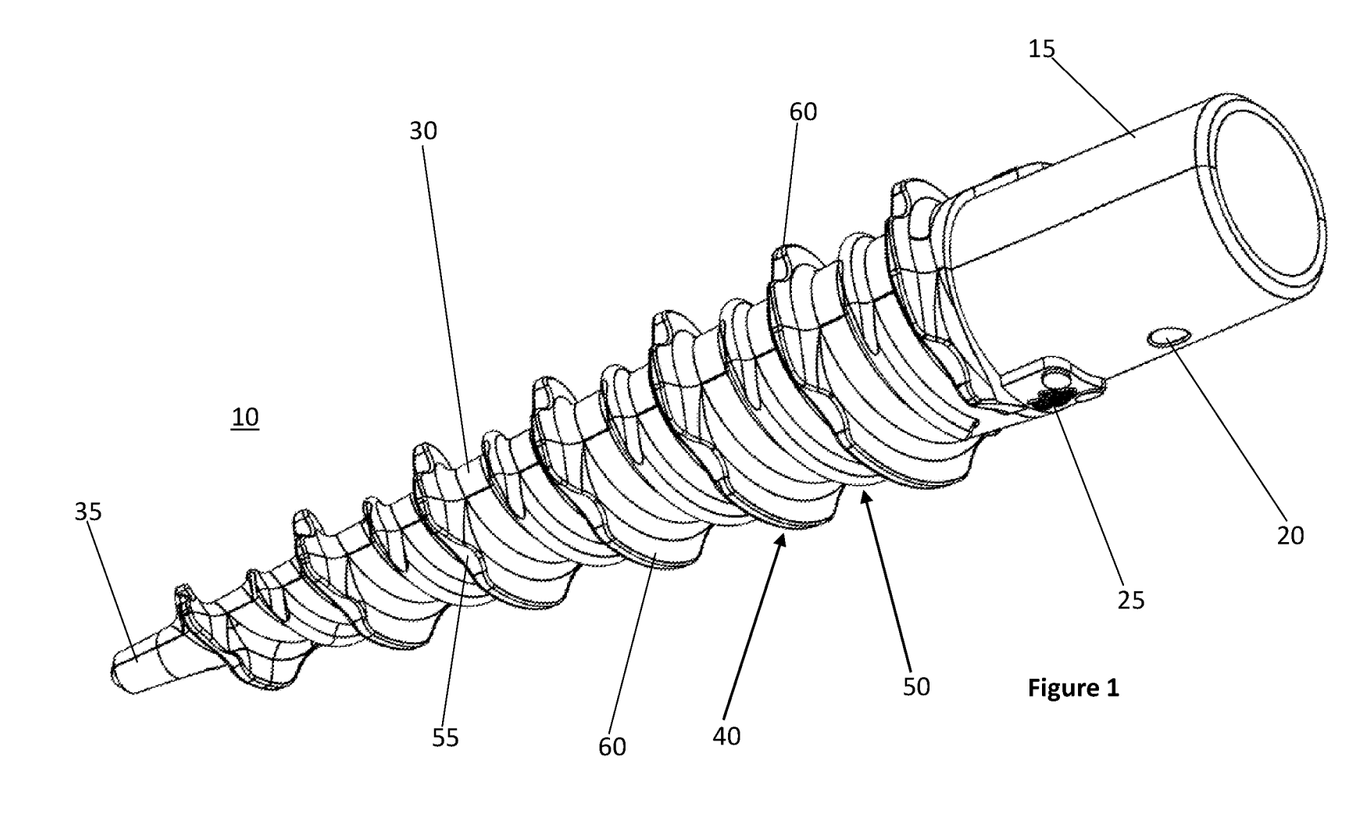
FIG. 1 is a perspective view of a molded screw, according to an embodiment of the present disclosure.
Figure 2:
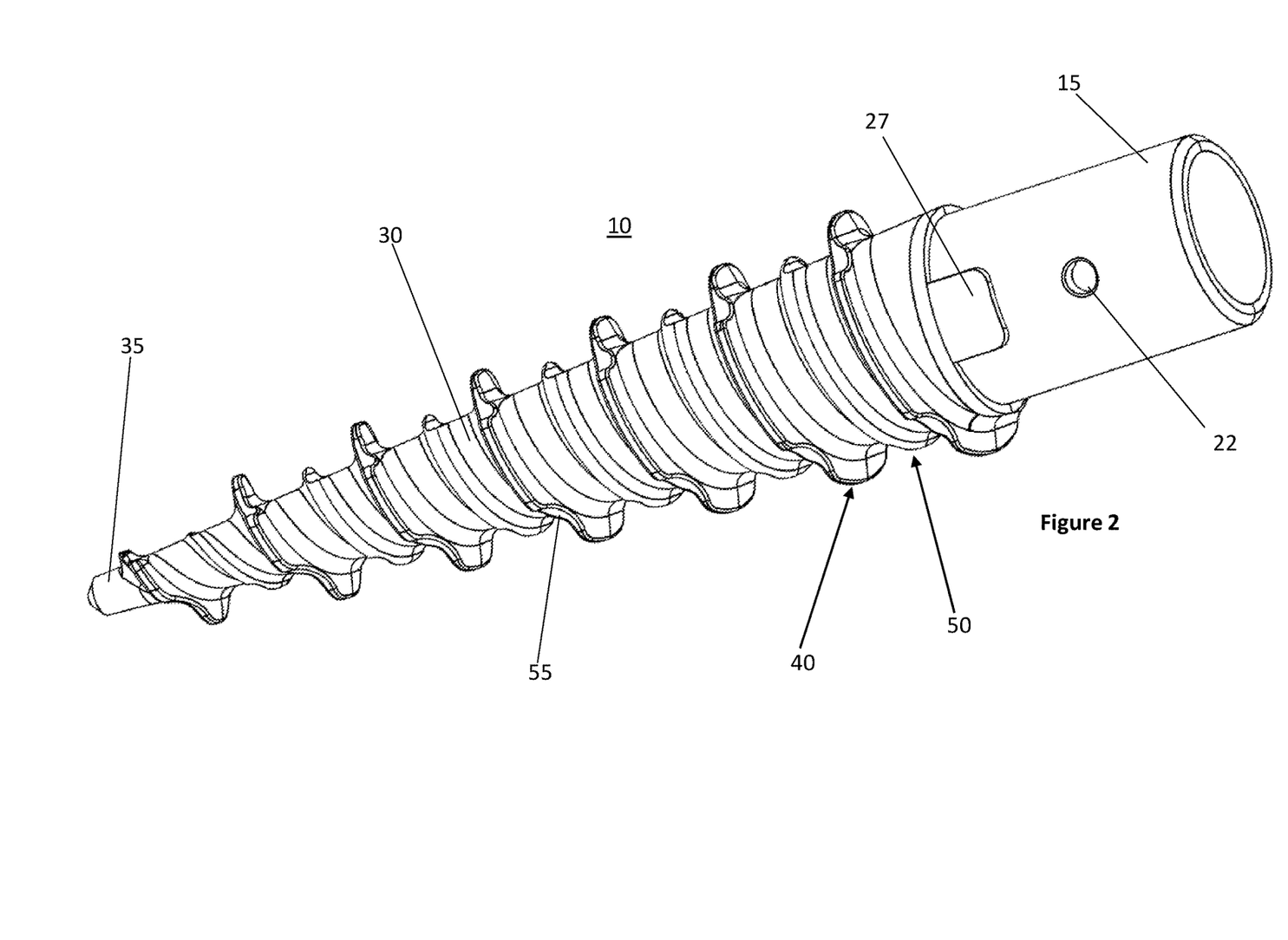
FIG. 2 is another perspective view of the molded screw shown in FIG. 1, according to an embodiment of the present disclosure.

With reference to FIGS. 1 and 2 and according to an embodiment of the present disclosure, a molded screw 10 is shown, the molded screw 10 to drive the lower end of a pole (not shown) into the ground. The screw 10 is preferably comprised of a sleeve portion 15 adapted to receive the pole (not shown). The sleeve portion 15 is further comprised of two openings 20, 22 to receive a bolt or a screw and lock the pole (not shown) therein. When the bolt or screw is positioned through the openings 20, 22, the screw 10 is held in the proper position relative to the pole (not shown). The sleeve portion 15 is also comprised of two projections 25, 27. The projections 25, 27 facilitate the alignment and positioning of the pole (not shown) relative to the screw 10. The projections 25, 27 also provide a surface on which to bear the stress and load of the pole (not shown). The screw 10 is further comprised of a shank 30, the shank 30 being conically shaped to facilitate insertion of the screw 10 into the ground. As shown, the shank 30 extends away from the sleeve 15 and terminates at a lower end 35 of the screw 10. The screw 10 is further comprised of a high thread 40. The high thread 40 extends downwardly along the shank 30 of the screw 10, from the sleeve 15 to the lower end 35 in a spiraling fashion. The screw 10 is also further comprised of a low thread 50.

The low thread 50 also extends downwardly along the shank 30 of the screw 10, from the sleeve 15 to the lower end 35 in a spiraling fashion. As shown, the high thread 40 and the low thread 50 spiral in alternating fashion along the shank 30 of the screw 10. Together, the high and low threads 40, 50 enhance the grip that the screw 10 has in the ground, which in turn stabilizes the screw 10 therein and helps prevent the pole (not shown) from rotating or otherwise bending due to winds or loads on the pole (not shown). The high thread 40 is further comprised of a plurality of recessed portions 55 along the length of the high thread 40. A purpose and advantage of the recessed portions 55 is to reduce the undercut of the high thread 40 to enable the screw 10 to be easily removed from the mold during manufacturing of the screw 10. The recessed portions 55 also provide an area in which dirt can flow during rotation of the screw 10 into the ground. Indeed, a worker skilled in the art would appreciate that during the rotational drilling process, as the screw 10 is inserted and spun into the ground, earth or dirt must necessarily compact or move around the screw 10 to make room for the screw 10 in the ground. The recessed portions 55 facilitate earth or other matter moving around the screw 10 and provide an area in which dirt flows during insertion of the screw 10. This helps prevent unwanted rotation or other movement of the screw 10 when in the ground. The recessed portions 55 also reduce friction acting on the high thread 40, which in turn reduces the effort to drill the screw 10 into the ground. The high thread 40 is also further comprised of a plurality of crest portions 60, the crest portions 60 alternating in between recessed portions 55. The crest portions 60 generally provide a cutting surface to cut into the dirt during drilling.

Figure 3:
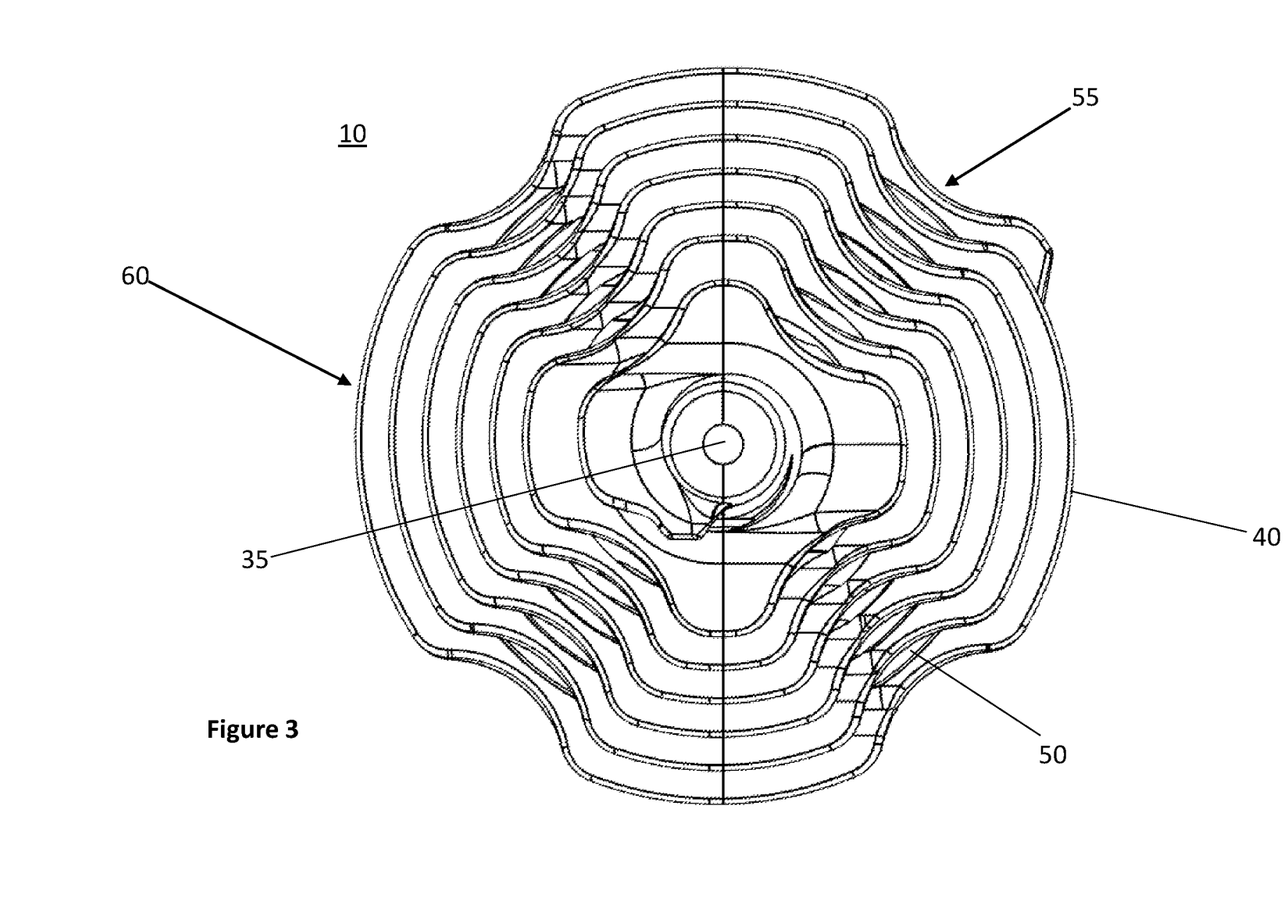
FIG. 3 is a front view of the molded screw shown in FIG. 1, according to an embodiment of the present disclosure.
Figure 4:
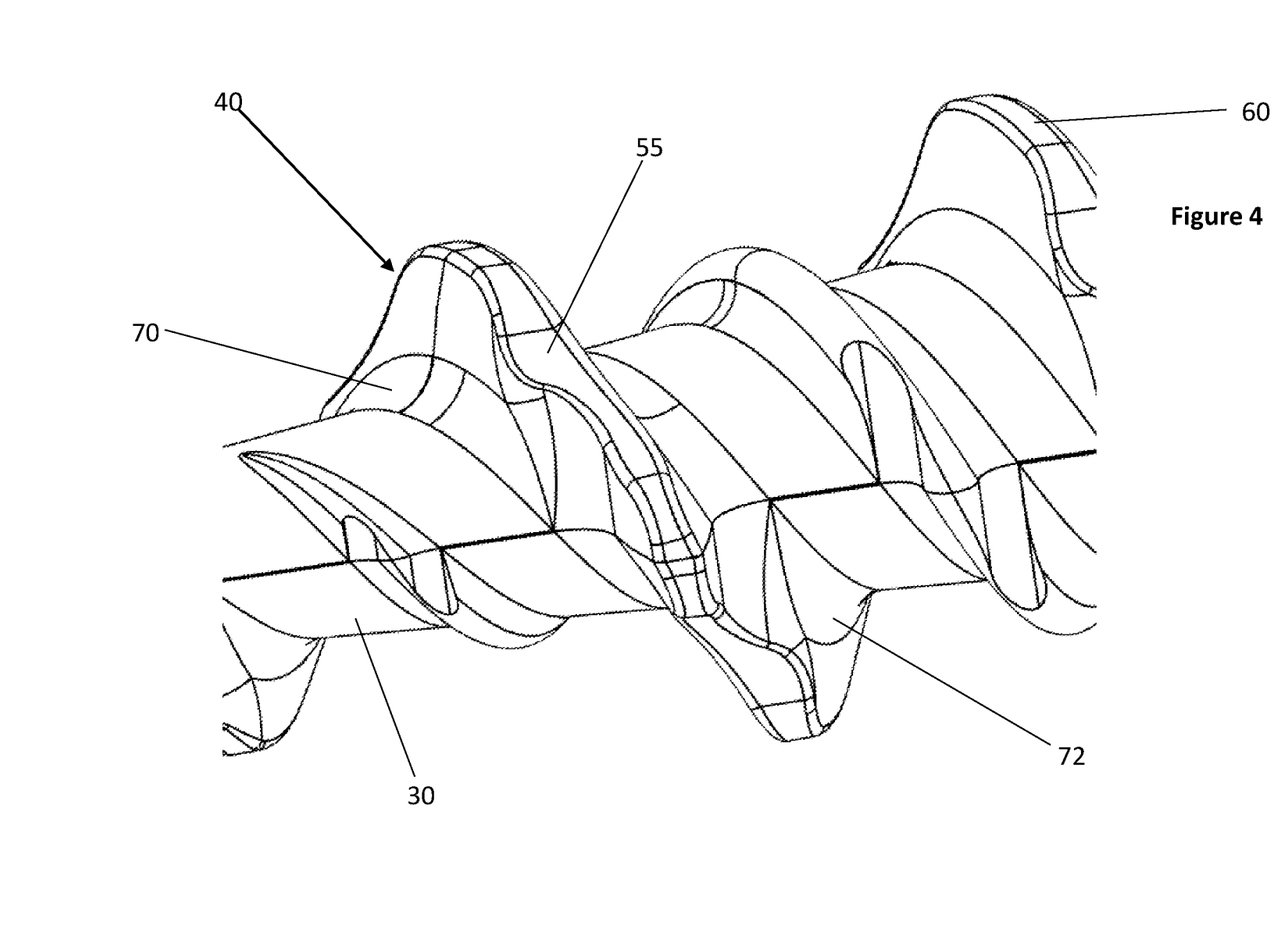
FIG. 4 is an enlarged perspective view of high and low threads on the molded screw shown in FIG. 1, according to an embodiment of the present disclosure.
Figure 5:
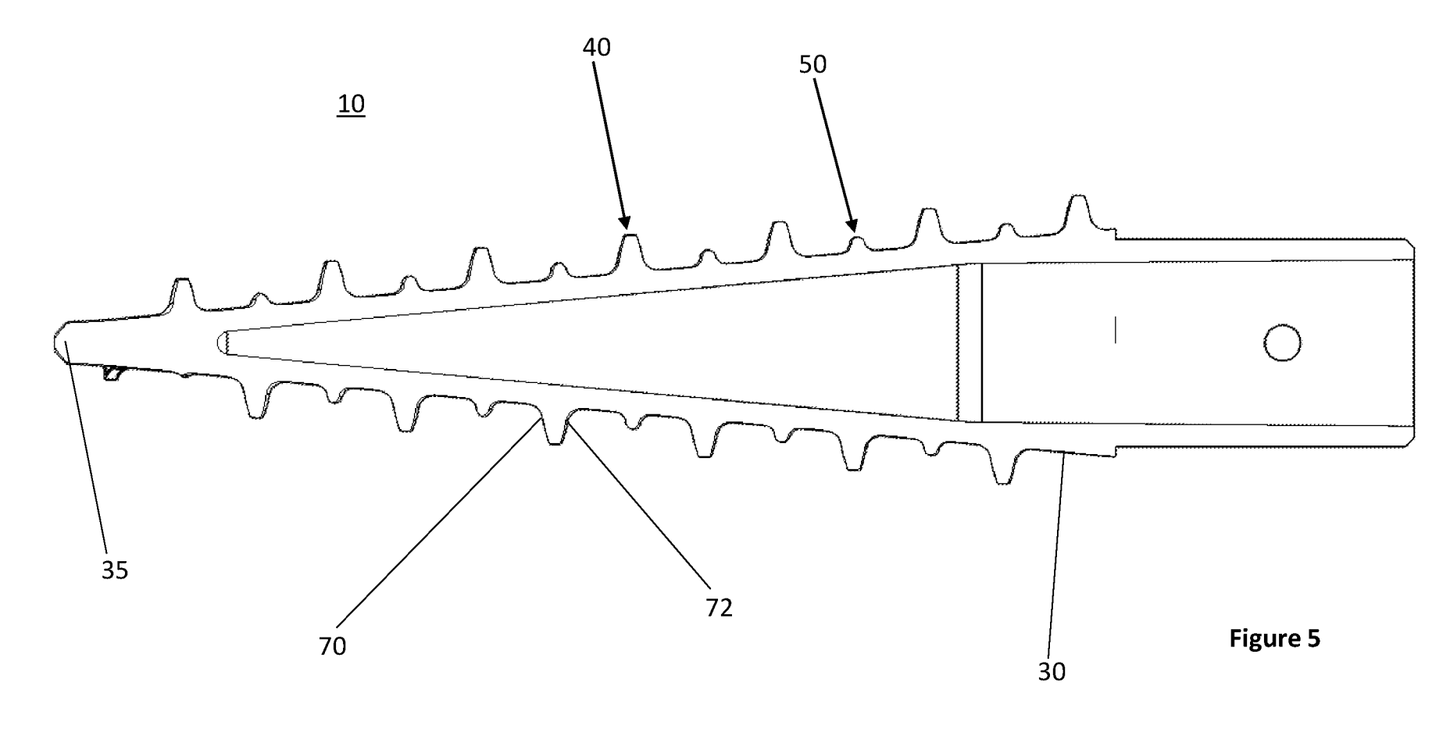
FIG. 5 is a side cross-sectional view of the molded screw shown in FIG. 1, according to an embodiment of the present disclosure.

With reference to FIGS. 3, 4 and 5 and according to an embodiment of the present disclosure, the high and low threads 40, 50 are shown positioned on the molded screw 10 in greater detail. As best shown in FIG. 3, the recessed portions 55 are shown in radial alignment along the length of the screw 10, while the crest portions 60 are also shown in radial alignment. There are four recessed portions 55 along each full circular spiral of the high thread 40, each equidistantly separated by 90-degrees. There are similarly four crest portions 60 along each full circular spiral of the high thread 40, each equidistantly separated by 90-degrees. The high thread 40 is also shown further comprised of a drive flank 70 and a pressure flank 72. The drive flank 70 is positioned on leading edge of the high thread 40, while the pressure flank 72 is positioned on a trailing edge of the high thread 40. A worker skilled in the art would appreciate that the leading edge is the edge on the high thread 40 that is closest to the lower end 35 of the screw 10, while the trailing edge is the opposite edge on the high thread 40, furthest from the lower end 35 of the screw 10. The drive and pressure flanks 70, 72 are curved to facilitate the movement of the earth during the drilling process of the screw 10. As shown, the curvature of the drive flank 70 flows into the recessed portion 55 to facilitate movement of dirt into the recessed portion 55.

Figure 6:
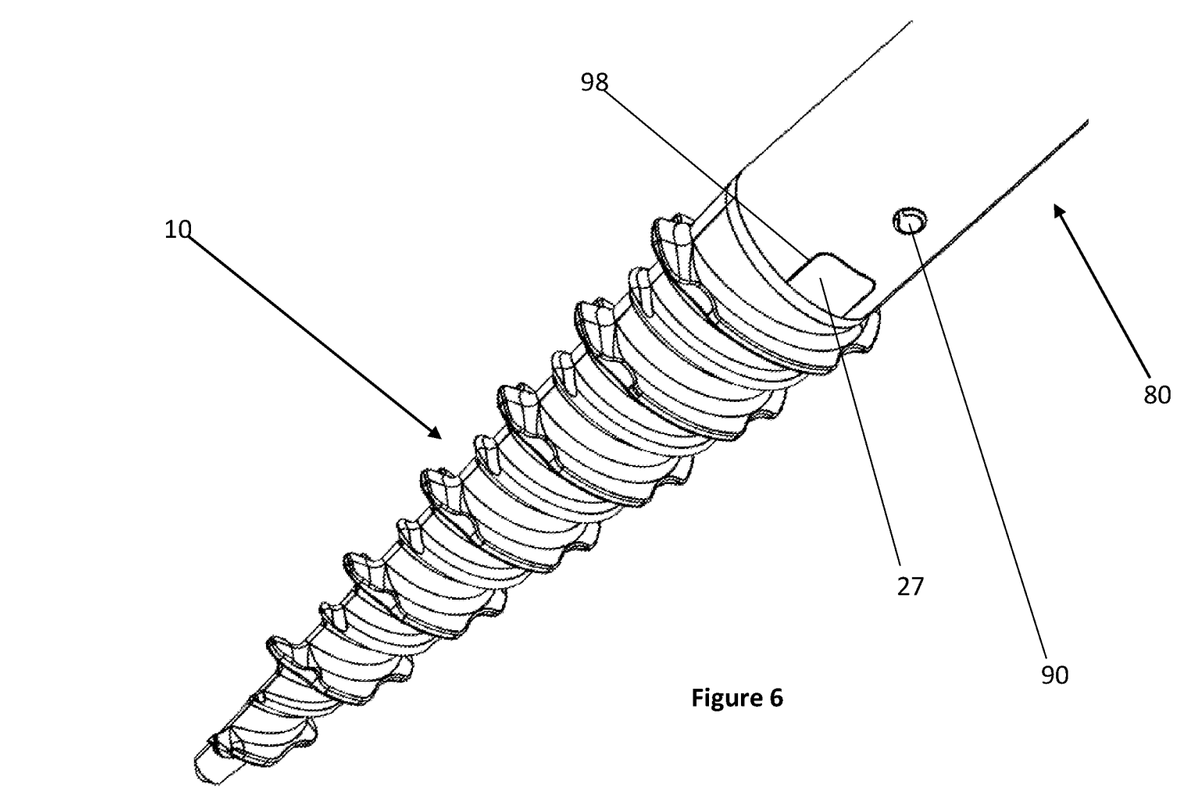
FIG. 6 is a perspective view of the molded screw shown in FIG. 1 releasably connected to a pole, according to an embodiment of the present disclosure.
Figure 7:
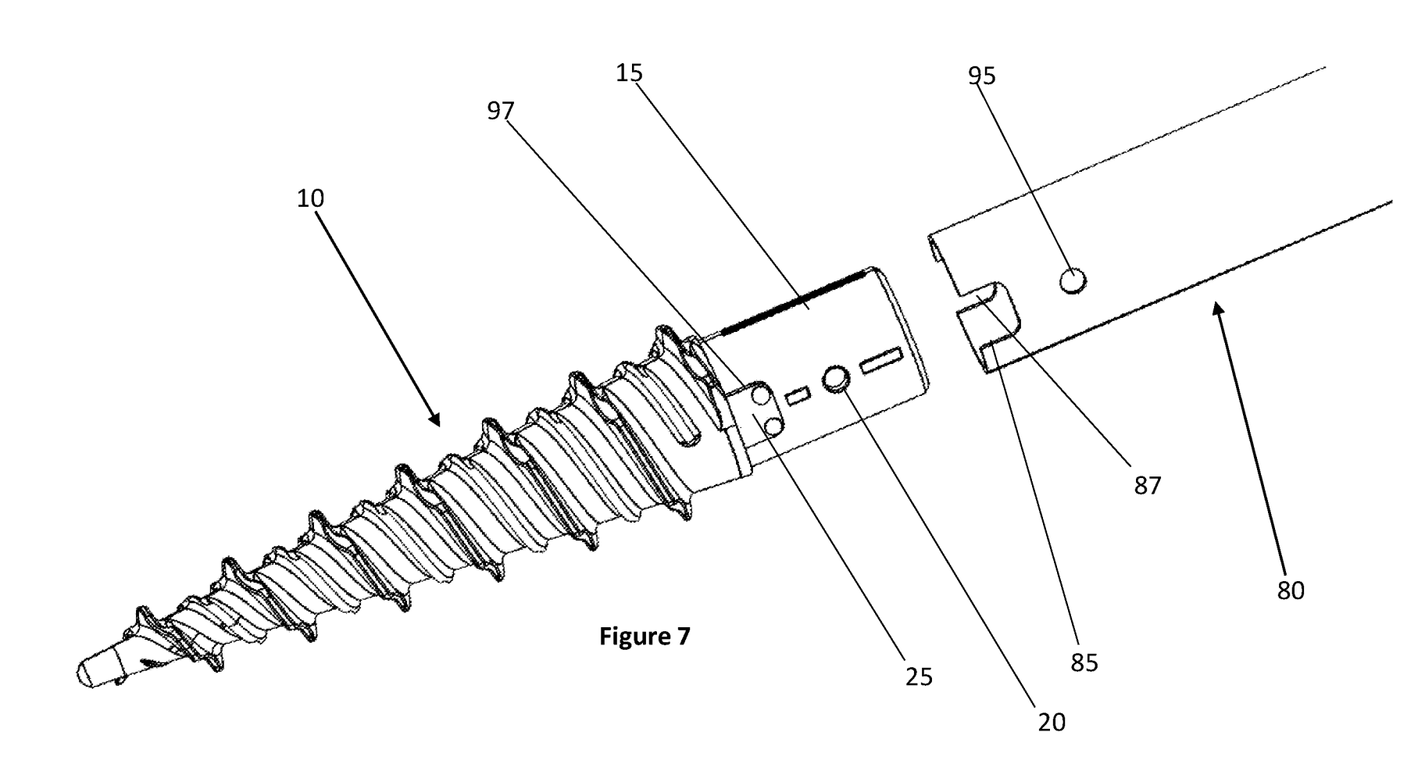
FIG. 7 is an exploded perspective view of the molded screw shown in FIG. 1 releasably connected to a pole, according to an embodiment of the present disclosure.

With reference to FIGS. 6 and 7 and according to an embodiment of the present disclosure, the molded screw 10 is shown releasably connected to a pole 80. As shown, the projections 25, 27 positioned on the sleeve portion 15 fits into corresponding indentations 85, 87 at a lower end of the pole 80. To releasably connect the pole 80 to the molded screw 10, the sleeve portion 15 is inserted into the aperture of the pole 80. The indentations 85, 87 are aligned with projections 25, 27 and continued insertion of the molded screw into the pole 80 locks the projections 25, 27 into corresponding indentations 85, 87. A pin 90 is then inserted into a first opening 95 of the pole 80 and through the opening 20 of the sleeve portion 15. This ensures that the pole 80 cannot be moved axially up or down without the molded screw 10. When the molded screw 10 is inserted into the ground or another surface, rotational movement of the pole 80 is transferred to the screw 10 by means of the indentations 85, engaging side walls 97, 98 of the projections 25, 27 respectively. In other words, the indentations 85, 87 engage or push against the side walls 97, 98 to transfer rotational movement. A worker skilled in the art would appreciate that in another embodiment, a bottom end of the pole 80 and the sleeve portion 15 could have corresponding non-circular shapes whereby rotational movement of the pole 80 would be imparted onto the molded screw 10. For example, the bottom end of the pole 80 and the sleeve 15 could have a hexagonal, square, or other suitable shape to impart rotary movement from one to the other. In yet another embodiment, the interconnection between the pole and the sleeve 15 could be present in an alternate type of screw, for example a screw having high and low threads without the recesses and crests as described herein, or a screw having a single thread without the recesses and crests.

Figure 8:
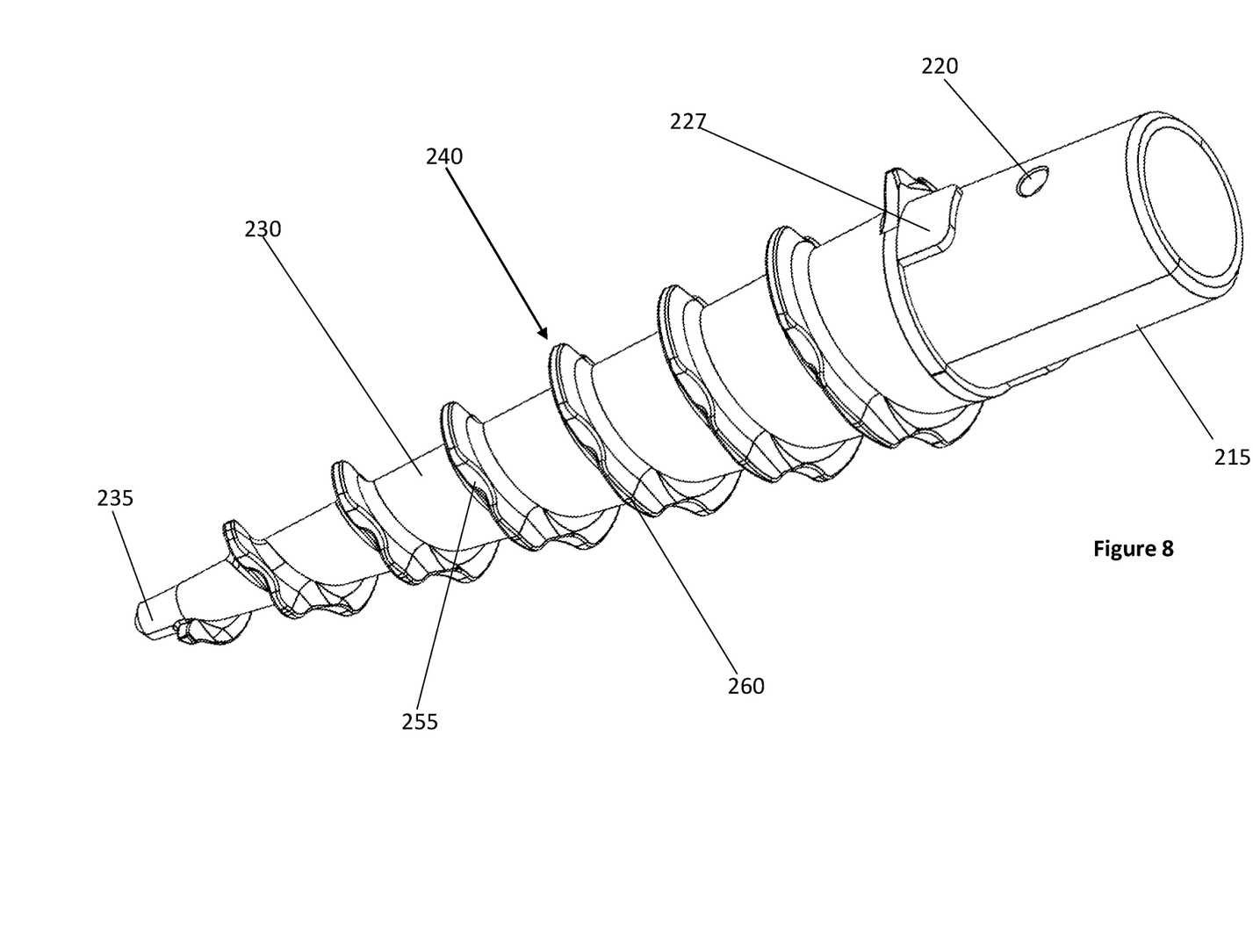
FIG. 8 is a perspective view of a molded screw, according to another embodiment of the present disclosure.
Figure 9:
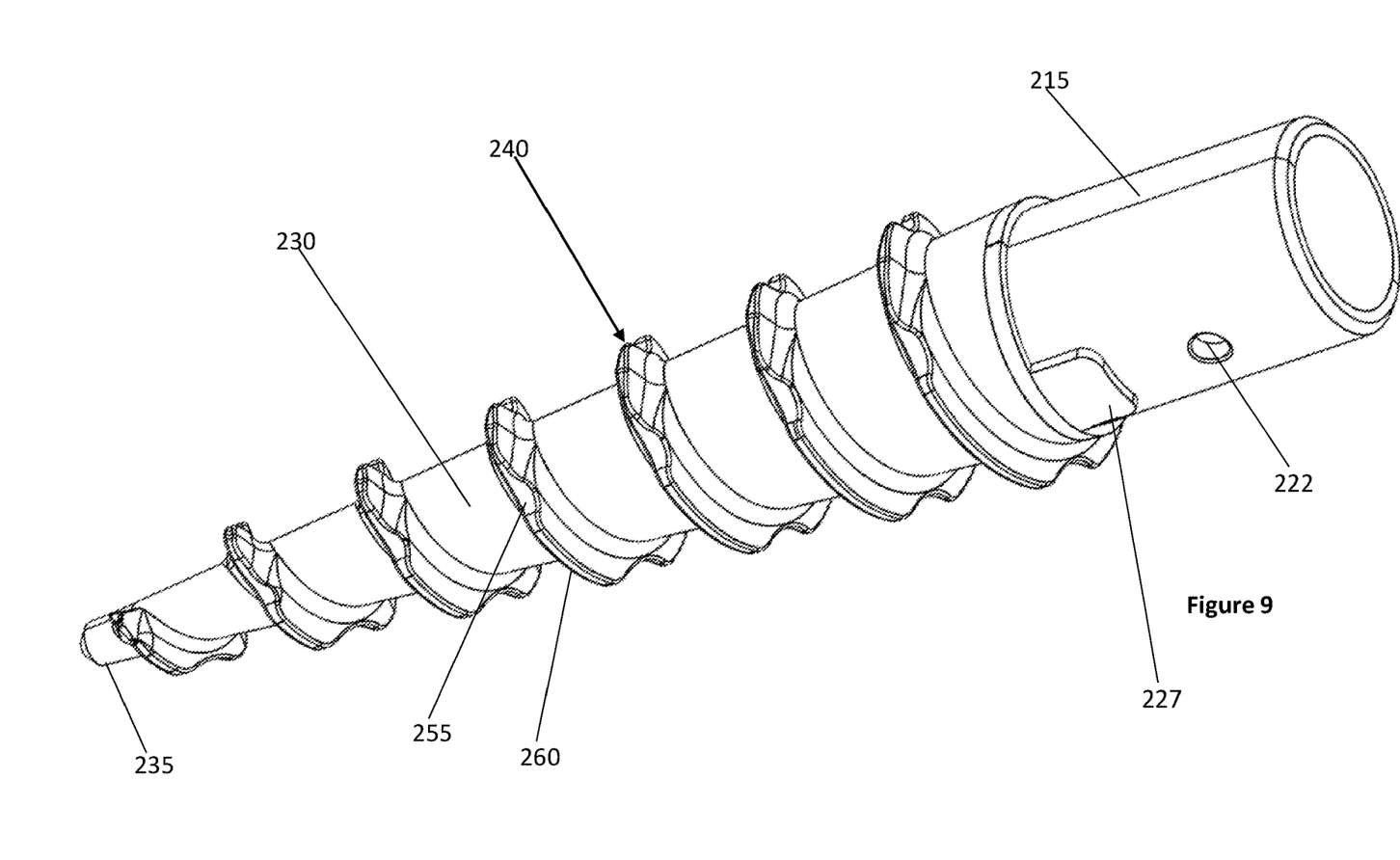
FIG. 9 is another perspective view of the molded screw shown in FIG. 8, according to another embodiment of the present disclosure; and, FIG. 10 is a side cross-sectional view of the molded screw shown in FIG. 8, according to another embodiment of the present disclosure.
Figure 10:
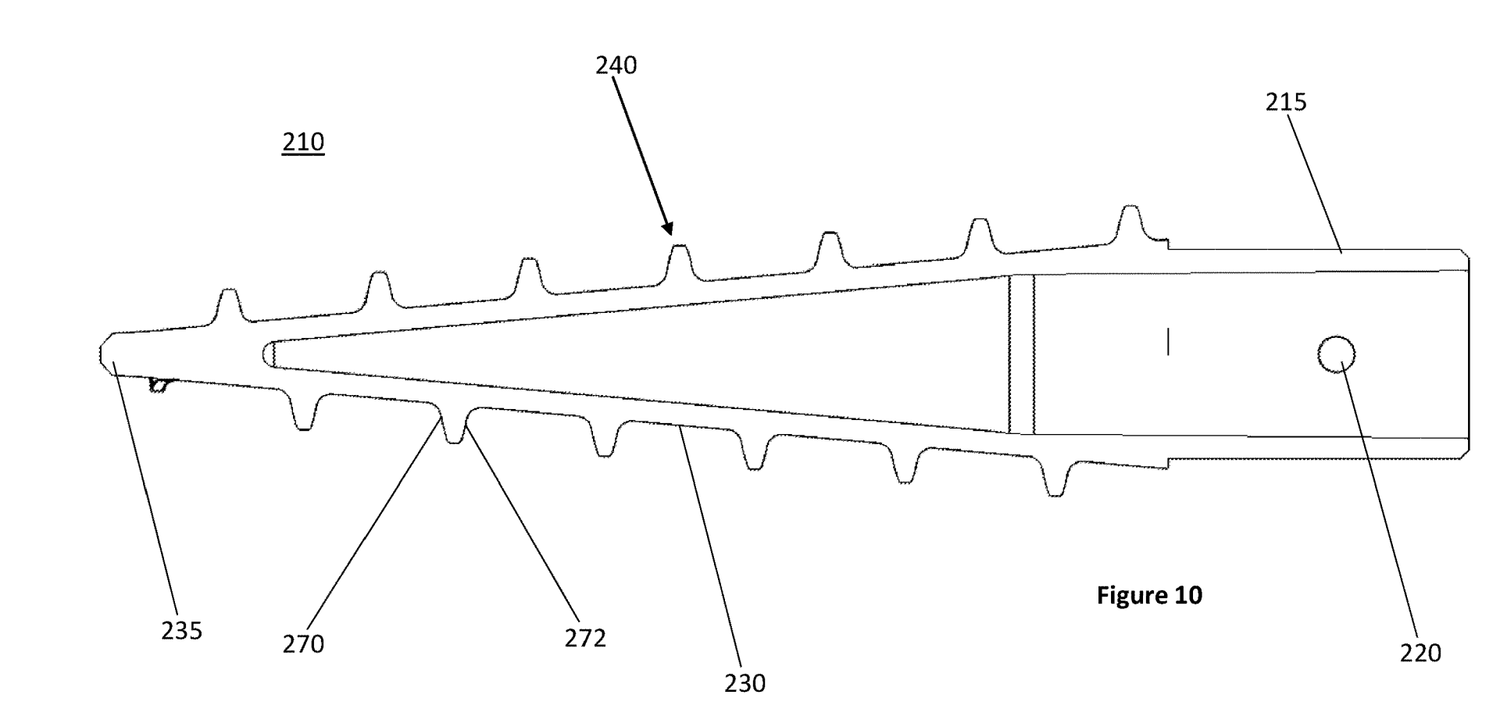

With reference to FIGS. 8, 9 and 10 and according to another embodiment of the present disclosure, a molded screw 210 is shown, the molded screw 210 to drive the lower end of a pole (not shown) into the ground. The screw 210 is preferably comprised of a sleeve portion 215 adapted to receive the pole (not shown). The sleeve portion 215 is further comprised of two openings 220, 222 to receive a bolt or a screw and lock the pole (not shown) therein. A purpose of the bolt or screw in the openings 220, 222 is to hold the screw 210 in the proper position relative to the pole (not shown). The sleeve portion 215 is also comprised of two projections 225, 227. The projections 225, 227 also facilitate the alignment and positioning of the pole (not shown) relative to the screw 210. The projections 225, 227 also provide a surface on which to bear the stress and load of the pole (not shown). The screw 210 is further comprised of a shank 230, the shank 230 being conically shaped to facilitate insertion of the screw 210 into the ground. As shown, the shank 230 extends away from the sleeve 215 and terminates at a lower end 235 of the screw 210. The screw 210 is further comprised of a thread 240. The thread 240 extends downwardly along the shank 230 of the screw 210, from the sleeve 215 to the lower end 235 in a spiraling fashion. As shown, the thread 240 is further comprised of recessed portions 255 and crest portions 260. The recessed portions 255 and crest portions 260 alternate along the length of the thread 240. The recessed portions 255 serve to reduce the undercut of the thread 240 to enable the screw 210 to be removed from the mold during manufacturing of the screw 210. The recessed portions 255 also provide an area in which dirt or another substance can flow during rotation of the screw 210 into the ground or other surface. The recessed portions 255 also reduce friction acting on the thread 240, which in turn reduces the effort to drill the screw 210 into the ground. In this particular embodiment, the recessed portions 255 are in radial alignment along the length of the screw 210, while the crest portions 260 are also in radial alignment. There are four recessed portions 255 along each full circular spiral of the thread 240, each equidistantly separated by 90-degrees. There are similarly four crest portions 260 along each full circular spiral of the thread 240, each equidistantly separated by 90-degrees. The thread 240 is also shown further comprised of a drive flank 270 and a pressure flank 272. The drive flank 270 is positioned on leading edge of the thread 240, while the pressure flank 272 is positioned on a trailing edge of the thread 240. The drive and pressure flanks 270, 272 are curved to facilitate the movement of the earth during the drilling process of the screw 210. The curvature of the drive flank 270 flows into the recessed portion 255 of the thread 240 to facilitate movement of dirt into the recessed portions 255. A worker skilled in the art would appreciate that the pole shown in FIGS. 6 and 7 can be releasably secured to the molded screw 210 in the same manner as was described.

Many modifications of the embodiments described herein as well as other embodiments may be evident to a person skilled in the art having the benefit of the teachings presented in the foregoing description and associated drawings.

It is understood that these modifications and additional embodiments are captured within the scope of the contemplated disclosure which is not to be limited to the specific embodiment disclosed.

The invention claimed is:

1. A molded screw comprising:
   a sleeve portion adapted to receive a pole; and,
   a conically shaped shank extending from the sleeve to a lower end of the molded screw, the conically shaped shank further comprising:
      a high thread comprising:
         crest portions; and,
         recessed portions alternating in between the crest portions, the recessed portions curving inwardly towards the conically shaped shank and smoothly transitioning into the crest portions along a length of the high thread to reduce friction of the molded screw during digging and prevent unwanted movement of the molded screw when secured in a substance; and,
      a low thread,
   wherein the high thread and the low thread extend from the sleeve portion to the lower end of the molded screw in an alternating spiral fashion,
   wherein the recessed portions comprise a peripheral surface that is smooth along a length of the conically shaped shank, the recessed portions to reduce an undercut of the high thread and facilitate the removal of the molded screw from a mold and to provide an area in which the substance can flow during rotation of the molded screw,
   and wherein the peripheral surface is positioned between a first surface and a second surface, and wherein each of the first surface and the second surface extend from the peripheral surface to opposed sides of the high thread.

2. The molded screw of claim 1 wherein the sleeve portion is further comprised of at least one projection configured to fit into a corresponding indentation of a pole.

3. The molded screw of claim 2 wherein the at least one projection is further comprised of a side wall, the side wall engageable by the corresponding indentation such that rotational movement of the pole is transferred to the molded screw.

4. The molded screw of claim 1 wherein the sleeve portion is further comprised of an opening.

5. The molded screw of claim 1 wherein the high thread is further comprised of a pressure flank positioned on a trailing edge of the high thread, the pressure flank being curved to facilitate movement of the substance during digging.

6. The molded screw of claim 1 wherein the recessed portions are radially aligned along a length of the molded screw.

7. The molded screw of claim 1 wherein the sleeve portion has a non-circular shape to fit into a bottom portion of the pole such that rotational movement of the pole correspondingly rotates the molded screw.

8. The molded screw of claim 1 wherein the high thread further comprises at least one drive flank positioned on a leading edge of the high thread, the at least one drive flank curving from the conically shaped shank to a base of the high thread to facilitate movement of the substance into the recessed portions during digging.

9. A molded screw comprising:
   a sleeve portion adapted to receive a pole; and,
   a conically shaped shank extending from the sleeve to a lower end of the molded screw, the conically shaped shank further comprising a thread that extends from the sleeve portion to the lower end of the molded screw in a spiral fashion, the thread comprising:
      crest portions; and
      recessed portions alternating in between the crest portions;
   wherein the recessed portions curve inwardly towards the conically shaped shank and smoothly transition into the crest portions along a length of the thread to reduce friction of the molded screw during digging and prevent unwanted movement of the molded screw when secured in the sub stance,
   wherein the recessed portions comprise a peripheral surface that is smooth along a length of the conically shaped shank, the recessed portions to reduce an undercut of the thread and facilitate the removal of the molded screw from a mold and to provide an area in which the substance can flow during rotation of the molded screw,
   and wherein the peripheral surface is positioned between a first surface and a second surface, and wherein each of the first surface and the second surface extend from the peripheral surface to opposed sides of the thread.

10. The molded screw of claim 9 wherein the sleeve portion is further comprised of at least one projection configured to fit into a corresponding indentation of a pole.

11. The molded screw of claim 10 wherein the at least one projection is further comprised of a side wall, the side wall engageable by the corresponding indentation such that rotational movement of the pole is transferred to the molded screw.

12. The molded screw of claim 9 wherein the sleeve portion is further comprised of an opening.

13. The molded screw of claim 9 wherein the thread is further comprised of a pressure flank positioned on a trailing edge of the thread, the pressure flank curved to facilitate movement of the substance during digging.

14. The molded screw of claim 9 wherein the recessed portions are radially aligned along a length of the molded screw.

15. The molded screw of claim 9 wherein the sleeve portion has a non-circular shape to fit into a bottom portion of the pole such that rotational movement of the pole correspondingly rotates the molded screw.

16. The molded screw of claim 9 wherein the thread further comprises at least one drive flank positioned on a leading edge of the thread, the at least one drive flank curving from the conically shaped shank to a base of the thread to facilitate movement of a substance into the recessed portions during digging.

* * * * *